United States Patent [19]

Chay

[11] 4,191,736
[45] Mar. 4, 1980

[54] PROCESS FOR REACTING LIQUIDS WITH SOLIDS
[75] Inventor: Dong M. Chay, Wilmington, Del.
[73] Assignee: E. I. Du Pont de Nemours and Company, Wilmington, Del.
[21] Appl. No.: 633,544
[22] Filed: Nov. 19, 1975
[51] Int. Cl.² ............................................. C01B 7/08
[52] U.S. Cl. .................................. 423/482; 261/92; 423/520; 423/659
[58] Field of Search ................ 252/361, 362, 363; 55/36, 87; 261/92; 259/7, 9, 10; 23/285; 423/482, 485, 520, 659; 134/34

[56] References Cited

U.S. PATENT DOCUMENTS

| | | | |
|---|---|---|---|
| 447,258 | 2/1891 | Patten | 261/92 |
| 1,165,815 | 12/1915 | Thelen et al. | 423/482 |
| 2,494,588 | 1/1950 | Skooglund | 23/285 |
| 2,517,339 | 8/1950 | Offut et al. | 423/659 |
| 3,057,702 | 10/1962 | Pierce et al. | 23/285 |
| 3,063,815 | 11/1962 | Redniss | 423/485 |
| 3,247,021 | 4/1966 | Steele et al. | 259/9 |
| 3,282,644 | 11/1966 | Quarles | 423/485 |

Primary Examiner—O. R. Vertiz
Assistant Examiner—Wayne A. Langel

[57] ABSTRACT

The foaming tendencies of continuous liquid-solid reactions which evolve gas are reduced by subjecting the reactant stream simultaneously to non-turbulent flow through an enclosed conduit having a vapor space above the flowing stream and to mild agitation to increase the liquid-solid and gas-liquid interface areas.

8 Claims, 2 Drawing Figures

PROCESS FOR REACTING LIQUIDS WITH SOLIDS

BACKGROUND OF THE INVENTION

The invention is directed to a method and device for reducing the foaming tendencies of reactions between liquids and solids which are accompanied by the evolution of gas.

Whenever gases are evolved from liquids, there is a tendency for the system to form a foam the stability of which varies highly from system to system. Among the variables which affect foam stability are viscosity, temperature, turbulence and surface tension. By and large, the formation of foams at best serves no useful purpose and is frequently a serious operating problem in that large amounts of non-gaseous product or reactant are lost to the evolving gases and frequently must be separated by further unit operations. In some instances, the necessity to reduce foaming may require operation at unnecessarily high temperatures.

Many mechanical means have been devised and used to "knock out" or "break" foams, e.g. demisters, baffles, sprays and impingement caps. However, these approaches may in some instances not be very effective for mechanically stable foams such as those produced during the reaction of viscous liquids at high temperatures accompanied by the evolution of substantial quantities of gas. A quite interesting example of a commercial process in which the problem has existed for many years is the manufacture of sodium bisulfate.

Sodium bisulfate is manufactured by a process involving the high temperature reaction of sulfuric acid with salt as follows:

$$NaCl + H_2SO_4 \xrightarrow{Heat} NaHSO_4 + HCl(gas).$$

The reaction is carried out on a commercial scale in large reactors in the molten phase. It has been found that, depending on the reactor temperature, the amount of foam build-up in the reactor varies and that excessive foaming interferes with the process. This gives rise to considerable impetus to reduce foaming in order that lower reaction temperatures and concomitantly lower energy costs can be realized.

BRIEF SUMMARY OF THE INVENTION

The invention is therefore directed to a method for carrying out liquid-solid reactions in such manner as to reduce the foaming tendencies of such reactions when gases are evolved therefrom. The invention is also directed to an apparatus for practicing the method. In particular, it has been found that foaming due to evolution of gases in continuous liquid-solid reaction systems can be reduced by carrying out the reaction under non-turbulent flow while simultaneously increasing the areas of the liquid-solid and gas-liquid interfaces.

In one aspect, the invention is directed to a process for continuously reacting a liquid with a first solid coreactive therewith by which a gas is evolved and a second normally solid product is formed and dispersed in the liquid comprising (1) forming a coreacting stream by admixing the liquid with particles of the first solid, the temperature of the admixture being sufficiently high to bring about the reaction; and (2) subjecting the coreacting stream to non-turbulent flow through an enclosed conduit having a vapor space above the admixture, through which evolved gas flows while subjecting the flowing coreacting stream to mild agitation to increase the liquid-solid and gas-liquid interface areas and remove gas from the coreacting liquid into the vapor space; and (3) continuing the flow of the coreacting stream and removal of gas therefrom for a time sufficient to attain a predetermined degree of the coreaction.

In a further aspect, the invention is directed to an apparatus for effecting continuous reaction between a liquid and a first solid coreactive therewith by which gas is evolved and a second normally solid material is formed in dispersion within the liquid comprising (a) a closed conduit transversely divided into a mixing zone communicating with a reaction zone;

(b) means for separately introducing liquid and particulate solids into the mixing zone;

(c) means within the mixing zone for forming a flowable dispersion of the liquid and solids and for passing the dispersion into the reaction zone;

(d) agitation means extending along a longitudinal axis within the lower part of the reaction zone for continuously advancing the dispersion through the reaction zone, and effecting an increase in the area of the interfaces among the phases present within the dispersion flowing therethrough; and (e) means for discharging the dispersion and gas from the downstream end of the reaction zone.

As used herein with respect to the reactant liquid and the first solid, the term "dispersion" refers to a physical admixture in which solid particles of first solid are dispersed throughout the reactant liquid. As used with respect to the reactant liquid and the solid product, the term "dispersion" includes not only physical admixtures, but also solutions of solid product in the reactant liquid.

DISCUSSION OF THE PRIOR ART

It is, of course, well known to provide agitation to liquid reaction systems in order to obtain thorough mixing of reactants, e.g. the use of propeller or paddle-type mixers in batch-type reaction vessels. These are, of course, comparatively high shear systems and are limited to low-foaming reaction systems and/or reaction systems susceptible to the effect of defoaming surfactants. It is also well known to use continuous screw conveyors inside reactors to move liquid or solid reactants or products from one point to another within the reactor. For example, in U.S. Pat. No. 3,841,908 to Ciersing, there is disclosed an inclined trough for carrying out extraction of liquids from solids countercurrently in which the solid material is carried upwardly countercurrent to a downflowing stream of solvent liquid. A somewhat similar configuration is disclosed in U.S. Pat. No. 3,443,909 to Goossens, who describes an inclined rotary drum reactor in which the rotating drum contains a fixed spiral for carrying liquid upwardly through the reactor. U.S. Pat. No. 3,524,730 describes a reactor for carrying out the reaction of viscous liquid material in which a rotating screw is used to conduct reactants from the inlet to the outlet and to mix the reactants as well. A similar device is disclosed in U.S. Pat. No. 3,057,702 to Pierce et al. in which a discontinuous screw arrangement is used to advance viscous materials from which vapors are emitted within a vacuum reaction vessel.

It does not appear, however, that the prior art has addressed itself to the problems of continuous liquid-solid reaction systems in which foaming due to evolution of gas is a serious problem.

DETAILED DESCRIPTION OF THE INVENTION

Figure 1:
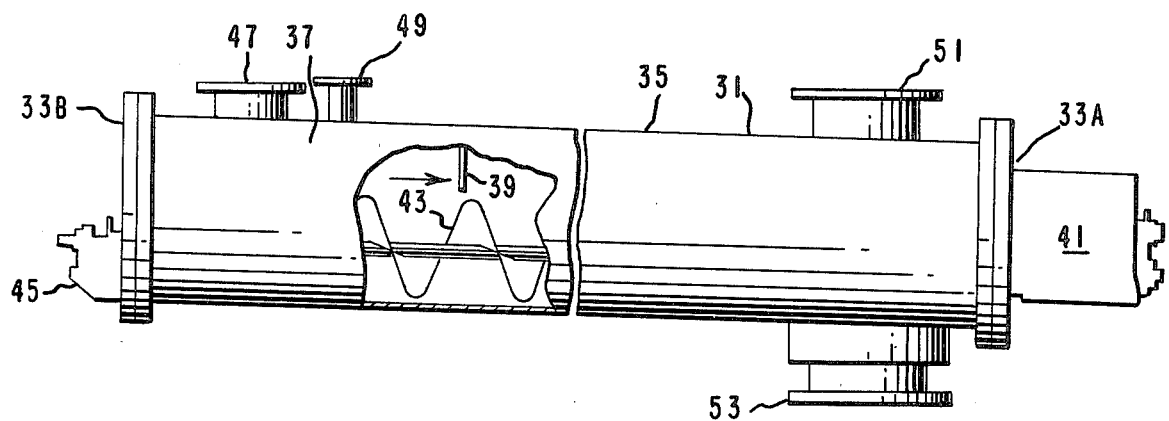

An important feature of the invention is carrying out the process while it is flowing in a non-turbulent manner. By non-turbulent flow is not meant necessarily laminar flow in the strict technical sense, but slow flow in which there is no substantial turbulence other than what is created by the mild action of the agitator and the evolving gases. In very low viscosity reaction systems, such non-turbulent flow can be achieved by the advancing action of the agitator alone even when the longitudinal axis of the reactor is horizontal. On the other hand, the feed end of the reactor can be elevated to a small extent to augment the advancing action of the agitator when more viscous systems are processed or when lower degrees of reaction are sought. It will be apparent to those skilled in the art that engineering economics and control considerations will in many instances determine the relationship between reactor length and the downward angle of flow. (As used herein, the term "Downward Flow Angle" refers to the downward angle formed between the longitudinal axis of the device and the horizontal.) In order to maintain a continuous vapor space and to avoid too much constriction of the vapor space at the discharge end of the reactor, the Downward Flow Angle should not exceed about 10° and is preferred to be from 1° to 10° and still more preferably from 2° to 5°.

The means for advancing the reactants to the downstream end of the reactor and for subjecting them to mild agitation will normally be a rotating continuous screw or modification thereof by which both the mild agitating action and advancing action are maintained. Suitable modifications such as discontinuity of the screw flight or use of ribbons in place of solid blades and similar variations will be apparent to those skilled in the art.

Of critical importance, however, is that the agitator means be capable of increasing the interface area among the three phases of the reaction system substantially without entraining any liquids into the vapor phase. To bring this about when using a screw-type agitator, it is necessary that from 10 to 80% of the screw surface lie above the liquid surface of the reactants. The optimum exposure of the screw surface into the vapor space will vary widely depending upon the reaction system and the screw configuration; however, exposure on the order of 10 to 40% will usually be preferred to optimize the relationship between minimum turbulence and maximum interface areas.

Because an important function of the invention is to carry out reactions in such manner as to minimize foaming problems, it is necessary that the apparatus contain substantial vapor space above the flowing stream of liquid and solid reactants and thus avoid both high vapor velocities and any substantial pressure drop. In particular, the vapor velocity should not be such as to cause any entrainment of liquid from the exposed blades of the agitator as they are wetted with reaction liquid. Again, the exact size of the vapor space will vary upon the volumes of gases emitted during the reaction relative to the volume of the flowing reactant stream.

Solid materials for use in the process of the invention must be in particulate form and of a size which can be readily dispersed in the liquid reactant. Thus, the particles of the first solid can range from fine powders to rather coarse granules, depending upon the physical characteristics of the reaction system under consideration. Among the factors to be considered are viscosity of the liquid reactant and dispersibility of the solids under reaction conditions. In some instances, it may be preferred to add inert surfactive agents to the system to improve dispersibility of the solids.

The mixing zone is preferably an integral part of the apparatus used for the process of the invention since it is important that the gases produced by the reaction be immediately released from the liquid reaction system. Thus, it is preferred that a mixing zone for the reactants discharge directly into the reaction zone and thus further minimize any foaming tendencies of the system. Furthermore, any plugging tendencies of the particular system can also be reduced by shortening the time interval between mixing and reaction accompanied by vapor emission.

Usually, the reactor used for the invention process will be cylindrical in cross section since this shape is more economical to construct. However, the particular configuration is not critical and other cross sections such as ovals, rectangles and the like can be used. Implicit in this lack of criticality as to the cross section configuration is the fact that the agitating means need not be disposed any particular distance from the inner walls of the reactor unless there exist peculiar problems of plugging in the system being processed. For the purposes of the process, the critical agitator variable is the relative surface area above and below the liquid reactants. Thus, in severely plugging systems, the screw-type agitator may be fitted closely to the perimeter of the reactor conduit. On the other hand, in non-plugging systems, the screw may occupy only a relatively small fraction of the cross sectional area, e.g., as little as 25 to 60%.

A preferred aspect of the invention as to the reduction of foaming is that the flow of gases and/or vapors from the reaction system be in a cocurrent direction with the flowing reaction stream, especially when the volume of gas is quite high. Thus, both the reactants and the evolved gas are preferably discharged from the downstream end of the reactor. It is not essential that the gas be vented from the reactor separately from the liquid discharge so long as venting means is provided in any liquid handling step which may follow. For example, the evolved vapors may be vented from a secondary reactor downstream as well as directly from the discharge end of the primary reactor.

Materials of construction for the apparatus to be used in the process of the invention will be chosen in accordance with the particular reaction environment—pressure, temperature, corrosiveness, etc. Furthermore, the reactor can be constructed in either a single stage or multiple stage. To save space, it will often be preferred to construct the reactor as two or more vessels in series. Both single and multiple-stage reactors are shown in the drawing which consists of two figures.

In FIG. 1, a side elevation of the reactor apparatus of the invention is shown in which the reaction zone is contained in a single stage.

Figure 2:
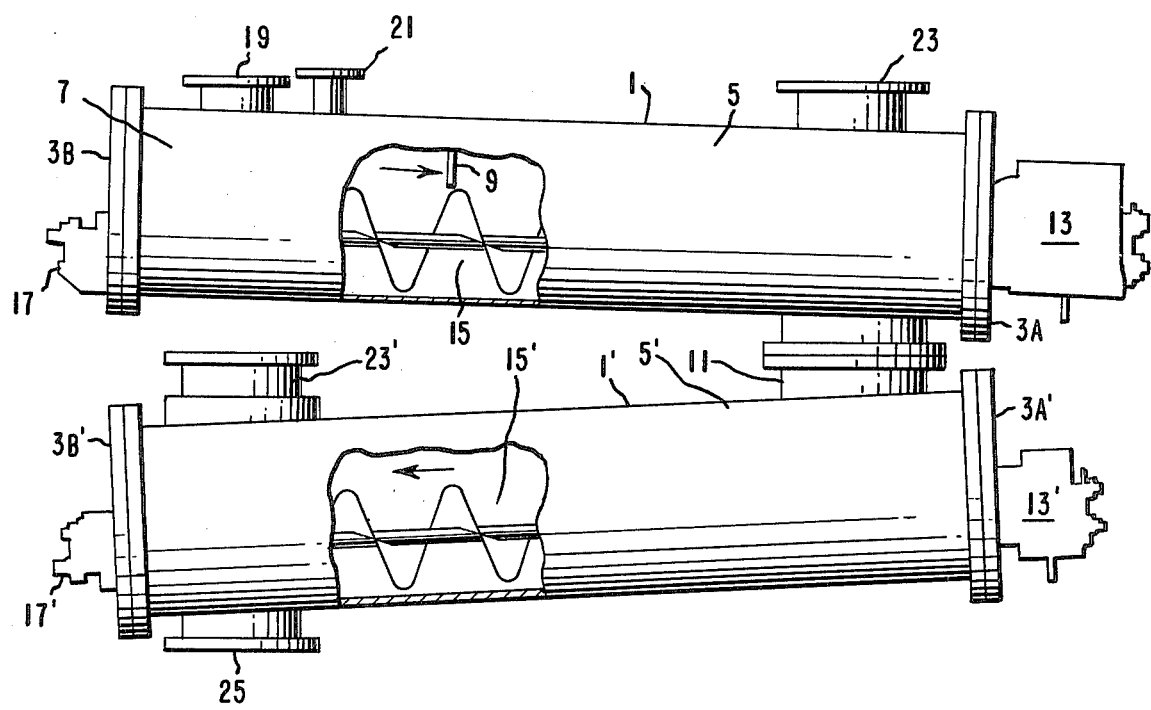

In FIG. 2, a side elevation of the reactor apparatus of the invention is shown in which the reaction zone is contained in two stages.

Referring now to FIG. 2 of the drawing, the first stage of the apparatus is comprised of a tubular shell (1) enclosed by solid end plates (3A, 3B). At the discharge end of the first stage on end plate (3A) is located an agitator drive assembly (13) operatively connected through the end plate with a continuous screw-type agitator (15) extending along a longitudinal axis of the shell through end plate (3B) and to end assembly (17).

The tubular shell (1) is divided into two zones, a mixing zone (7) which is separated from reaction zone (5) by means of solid partition (9) which extends around the agitator blade in close proximity to its perimeter. The partition is preferred in those instances in which it is desired to prevent unmixed liquid or solids from entering the reaction zone until they have been exposed to the mixing action of the screw. Granular solids are introduced into the reactor through solids inlet line (19) and the liquid reactant medium is introduced into the reactor via liquid inlet line (21).

The granular solids and liquid are mixed as they drop into the screw mechanism and are immediately passed into reaction zone (5) where the liquid and solid reactants continue to react with the evolution of gas.

At the lower end of the first reaction zone, the vapors are removed through gas vent (23) and the reactant dispersion falls through transfer line (11) to the second reaction zone (5'), which, for all intents and purposes, functions merely as an extension of the first reaction zone (5). The second stage (1') is therefore functionally identical to the first stage (1) except that it does not require an additional mixing zone.

In the second reaction zone (5'), the reactants are advanced by gravity and by agitator (15') to the lower end of the reactor at which point the vapors are removed through gas vent (23') and the reactant dispersion is discharged through reaction product outlet (25).

Referring now to FIG. 1 of the drawing, it will be noted that the single stage reactor is constructed in the same manner as the two-stage reactor and has all the functional parts thereof except the duplicate components (FIG. 2, components 3A', 3B', 5', 13', 15', 17' and 23') and the transfer line. Thus, the single stage reactor is comprised of tubular shell (31) enclosed by end plates (33A, 33B) in which partition (39) divides the shell transversely into a mixing zone. (37) and a reaction zone (35). Along a longitudinal axis of the tubular shell is a continuous screw agitator (43) which is driven by agitator drive assembly (41) extending through end plate (33A). The agitator extends through end plate (33B) and is supported by end assembly (45). Solids inlet (47) and liquid inlet (49) are located in the top of the mixing zone. Gas is vented from the lower discharge end of the reactor through gas vent (51) and the flowing dispersion of liquid and dispersed solids is discharged from the bottom of discharge end of the reactor through reaction product outlet (53).

The process and apparatus of the invention will be further understood by reference to the examples given hereinbelow in which the process and apparatus are demonstrated as a pre-reactor for a continuous process of making sodium bisulfate by reaction of salt (NaCl) with sulfuric acid as described hereinabove.

The reactor was fabricated from Pyrex ® glass tube 15¼ inches long. Extending longitudinally from one end plate along the tube to the opposite end of the tube is ½" diameter cast iron continuous screw 14½ inches in length, which is rotatable at 70 rpm. The axis of the screw is about 7/16 inch from the bottom of the tube and about 11/16 inch from the top of the tube. At the drive end atop the tube are located two connections which serve as acid inlet and salt inlet respectively. These discharge directly onto the rotating screw. At the discharge end atop the tube are located two more connections which serve as thermocouple wells for both vapor and liquid phase leaving the reactor through a single connection on the under side of the tube. The vapor-phase thermocouple well connection also serves as a vent for the first stage reactor. The discharge of the reactor drops into a vented secondary rection vessel in which the reaction is completed at higher temperatures.

The secondary reaction vessel is heated by an electric heating mantle surrounding the lower half of the vessel. The primary reaction is heated by means of electric heating tape wrapped around the Pyrex ® tube. During operation of the above-described apparatus, a slight vacuum is maintained at the gas vents. The following procedure was followed during Runs 1-4 of the Examples.

EXAMPLES

The reactor and secondary reaction vessel were preheated to temperatures at which they would be operated. The first stage Downward Flow Angle was adjusted to 2° to promote the flow of reaction product. The reactor and secondary reaction vessel were also maintained under a partial vacuum via the HCl gas take-off line from the reactor gas vent on the secondary reactors. After the screw of the reactor was turned on at 70 rpm, preheated NaCl granules were fed continuously into the reactor at the rate of 8 g/min. Simultaneously, 99.5% by weight preheated concentrated sulfuric acid was also fed into the reactor at the rate of 13.5 g/min.

The reaction between NaCl and $H_2SO_4$ is immediate when they come in contact and HCl is generated. Thus, foam began to be generated quickly. The amount of foam build-up depends on the operating conditions. The level of foam is self-maintaining with the aid of the agitating action of the screw which helps to release the HCl gas rapidly as it is generated.

The HCl reaction product was removed from either the reactor or the secondary reaction vessel. The relatively fluid slurry from the discharge end of the reactor dropped into the secondary reaction vessel. Thus, both the slurry and any remaining foam were discharged into the secondary reaction vessel.

The partially reacted product from the reactor was discharged continuously into the secondary reaction vessel at temperatures substantially higher than the initial temperature of the reactor. As the reactants completed their reaction in the secondary reaction vessel, a layer of foam was built up on the top of the molten layer of $NaHSO_4$.

A total of 520 gms NaCl and 880 gms $H_2SO_4$ were used in each test. After the test was completed, the product in the secondary reaction vessel was heated for an additional 5 minutes at which time all the foam became liquid. The molten product was then poured out into an aluminum pan and cooled. X-ray analyses of the solidified product showed that the product was 100% $NaHSO_4$.

Four test runs were carried out in which both Downward Flow Angle and the extent of immersion of the screw were varied. In addition, the two modes of HCl removal described above were observed. The results of these tests are given in Table 1 below.

TABLE I

| Run No. | Reactant Feed Rates grams/minute | | Reactor Variables | | | | | Secondary Reacton Vessel Variables | | |
|---|---|---|---|---|---|---|---|---|---|---|
| | NaCl | H$_2$SO$_4$ | Temp. (°C.) | Downward Flow Angle (°) | Screw Exposure (%) | Retention Time (seconds) | Extent of Reaction (%) | Temp. (°C.) | Maximum Foam Level (cm) | HCl Vent Stage |
| 1  | 8.0  | 13.4 | 160 | 1       | 10       | 75 | 65 | 300 | 2.5  | First  |
| 1a | 8.0  | 13.4 | —   | Stage 1 | Bypassed | —  | —  | 300 | 3.5  | First  |
| 2  | 11.0 | 18.4 | 170 | 2       | 0        | 70 | 70 | 280 | 5.0  | Second |
| 2a | 11.0 | 18.4 | —   | Stage 1 | Bypassed | —  | —  | 280 | 12.0 | Second |
| 3  | 8.0  | 13.4 | 160 | 5       | 20       | 65 | 60 | 290 | 3.2  | First  |
| 3a | 8.0  | 13.4 | —   | Stage 1 | Bypassed | —  | —  | 290 | 5.0  | First  |
| 4  | 8.0  | 13.4 | —   | 10      | 40       | 50 | 55 | 280 | 4.0  | Second |

The above data show clearly the effect of reduced retention time as the Downward Flow Angle is increased and the concomitant reduction in degree of conversion as the retention time is reduced. Comparison of Runs 1, 2 and 4 shows a definite inverse correlation between screw immersion and the amount of foam in the secondary reaction vessel at the same feed rate. Though the foam height in Run No. 2 was higher than the other runs, this was attributable primarily to the higher feed rate.

Of particular interest is the fact that the screw seemed to accomplish its function of facilitating release of the gas equally well and, in some instances, even better when the amount of exposed screw surface was small. For this reason, agitator exposure of 10 to 40% is preferred. Of related interest, too, is the fact that the amount of foam build-up in the secondary reactor always increased markedly when the reactants were bypassed around the reactor and fed directly into the secondary reaction vessel and was then reduced when feeding of reactants to the reactor was resumed (Runs 1a, 2a and 3a).

I claim:

1. In a process for continuously reacting a liquid with a first solid coreactive therewith in which a gas is evolved and a second normally solid product is formed and dispersed in the liquid, the foaming tendencies of the reaction are reduced by
   (1) forming a coreacting stream by admixing the liquid with granules of the first solid, the temperature of the admixture being sufficiently high to bring about the reaction; and
   (2) subjecting the coreacting stream to non-turbulent flow through an enclosed conduit having a continuous vapor space above the admixture, while subjecting the flowing coreacting stream to mild agitation to increase the liquid-solid and gas-liquid interface areas and remove gas from the coreacting liquid into the vapor space; and
   (3) continuing the flow of the coreacting stream and removal of gas therefrom for a time sufficient to attain a predetermined degree of the coreaction.

2. The process of claim 1 in which the coreacting stream is mildly agitated and gas removed therefrom by operation of a rotating continuous screw in which from about 10 to about 80% of the screw surface lies above the surface of the flowing liquid within the vapor space.

3. The process of claim 1 in which the longitudinal axis of the conduit forms an angle of from about 1° to 10° with the horizontal by which the coreacting stream is subjected to gravity flow.

4. The process of claim 1 in which the evolved gas flows cocurrently with the coreacting stream.

5. The process of claim 1 in which a continuous positive flow of vapor is maintained through the vapor space cocurrently with the coreacting stream.

6. The process of claim 1 in which the liquid is an aqueous solution of sulfuric acid, the first solid is sodium chloride, the evolved gas is hydrogen chloride and the second solid is sodium bisulfate.

7. The process of claim 1 in which the second solid is soluble in the liquid.

8. The process of claim 1 in which the second solid is insoluble in the liquid and is maintained as a dispersed phase with the liquid by action of the evolving gas from the coreacting stream.